(12) United States Patent
Niedermeier

(10) Patent No.: US 11,827,010 B2
(45) Date of Patent: Nov. 28, 2023

(54) APPARATUS AND METHOD FOR MONITORING PRINTED CONTAINERS

(71) Applicant: KRONES AG, Neutraubling (DE)

(72) Inventor: Anton Niedermeier, Offenstetten (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/643,677

(22) PCT Filed: Sep. 4, 2018

(86) PCT No.: PCT/EP2018/073752
§ 371 (c)(1),
(2) Date: Mar. 2, 2020

(87) PCT Pub. No.: WO2019/043257
PCT Pub. Date: Mar. 7, 2019

(65) Prior Publication Data
US 2020/0269603 A1  Aug. 27, 2020

(30) Foreign Application Priority Data

Sep. 4, 2017  (DE) .................... 10 2017 120 281.1

(51) Int. Cl.
*B41F 33/00* (2006.01)
*B41J 3/407* (2006.01)
(Continued)

(52) U.S. Cl.
CPC ......... *B41F 33/0036* (2013.01); *B41J 3/4073* (2013.01); *B41J 3/40733* (2020.08);
(Continued)

(58) Field of Classification Search
CPC .................................................. B65B 61/025
(Continued)

(56) References Cited

U.S. PATENT DOCUMENTS 6,069,704 A * 5/2000 Verhaag ..................... B41J 3/60
271/291
6,267,057 B1 * 7/2001 Albert ................. B41F 33/0009
101/483

(Continued)

FOREIGN PATENT DOCUMENTS

CN          1787593      6/2006
CN        104346107      2/2015
(Continued)

OTHER PUBLICATIONS

International Search Report and Written Opinion dated Nov. 16, 2018 issued in corresponding International Application No. PCT/EP2018/073752.

(Continued)

*Primary Examiner* — Thanh K Truong
*Assistant Examiner* — Patrick B Fry
(74) *Attorney, Agent, or Firm* — Onello & Mello, LLP

(57) ABSTRACT

Monitoring device (50, 52) for monitoring a plurality of containers (10) which have been printed with at least one first image element (B1-B8) by a direct printing machine (20), having a transport device (40) which supplies and/or discharges the printed containers (10) to be monitored along a predefined transport path, in particular individually and successively, to the monitoring device (50, 52), wherein the monitoring device (50, 52) monitors the printed containers (10) at least with respect to the first image element (B1-B8) applied by the direct printing machine (20), and has a memory device (53) which stores the at least one set of first image elements (B1-B8) to be monitored. According to the invention, for each container (10) to be monitored, the monitoring device (50, 52) carries out monitoring taking into account at least one image element (B1-B8) uniquely (Continued)

Figure 1:
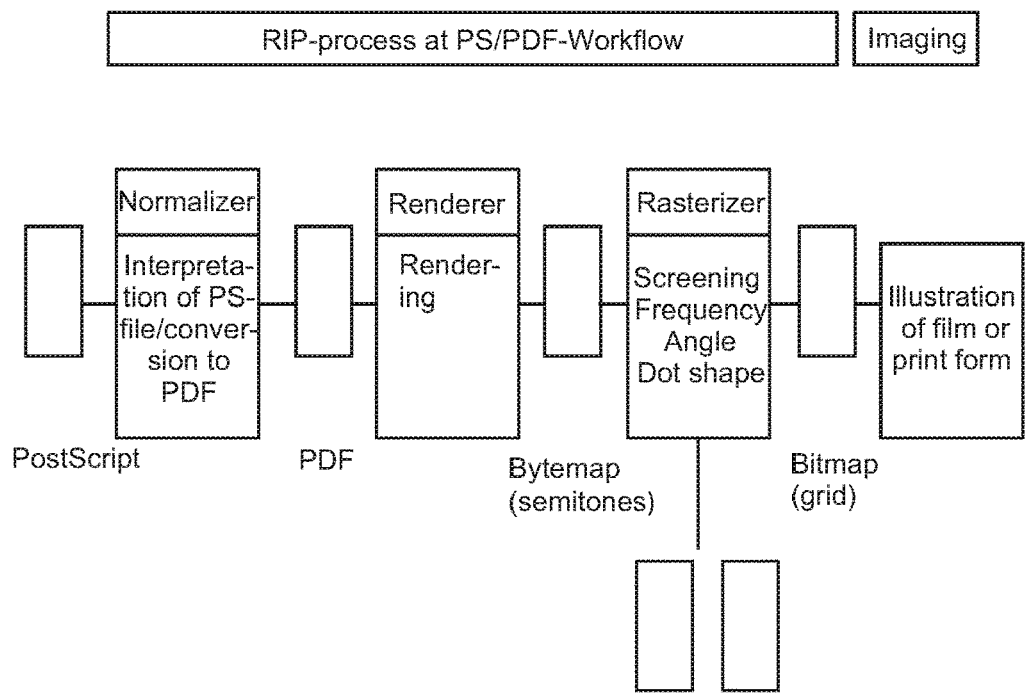

assigned to this container (10) to be monitored from the set of first image elements (B1-B8) to be monitored.

20 Claims, 6 Drawing Sheets

(51) Int. Cl.
    *B65B 57/02*     (2006.01)
    *B65B 61/02*     (2006.01)
    *B65B 3/04*     (2006.01)
    *B65B 7/16*     (2006.01)

(52) U.S. Cl.
    CPC ............ *B65B 3/04* (2013.01); *B65B 7/16* (2013.01); *B65B 57/02* (2013.01); *B65B 61/025* (2013.01)

(58) Field of Classification Search
    USPC ........................................................ 53/411
    See application file for complete search history.

(56) References Cited

U.S. PATENT DOCUMENTS

| | | | |
|---|---|---|---|
| 6,369,843 B1* | 4/2002 | Springett | B41J 2/355 347/173 |
| 6,658,817 B1* | 12/2003 | Eve | B65B 61/26 53/411 |
| 7,171,796 B2* | 2/2007 | Spirito | B65B 19/32 53/151 |
| 7,264,328 B2* | 9/2007 | Folkins | B41J 29/393 347/19 |
| 8,023,138 B2 | 9/2011 | Lapstun et al. | |
| 8,141,981 B2* | 3/2012 | Obertegger | B41J 2/16588 347/89 |
| 9,639,308 B2 | 5/2017 | Meng | |
| 9,649,856 B2 | 5/2017 | Lindner et al. | |
| 9,770,922 B2 | 9/2017 | Cofler | |
| 9,834,027 B2 | 12/2017 | Bracher et al. | |
| 9,962,978 B2 | 5/2018 | Izume | |
| 10,144,237 B2* | 12/2018 | Sonnauer | B41J 29/393 |
| 10,255,397 B2* | 4/2019 | Cai | G03F 1/36 |
| 2007/0091363 A1* | 4/2007 | Han | G11B 33/122 358/1.15 |
| 2009/0236154 A1 | 9/2009 | Lapstun et al. | |
| 2011/0123214 A1* | 5/2011 | Van Vliembergen | G03G 15/502 399/82 |
| 2015/0138295 A1 | 5/2015 | Lindner et al. | |
| 2015/0298467 A1 | 10/2015 | Cofler | |
| 2015/0379379 A1 | 12/2015 | Kubota et al. | |
| 2016/0170696 A1 | 6/2016 | Meng | |
| 2016/0231968 A1 | 8/2016 | Bracher et al. | |
| 2017/0157964 A1 | 6/2017 | Masayuki | |
| 2017/0277813 A1* | 9/2017 | Cai | G06F 30/398 |
| 2017/0313112 A1 | 11/2017 | Sonnauer et al. | |
| 2017/0341420 A1 | 11/2017 | Cofler | |
| 2019/0084327 A1 | 3/2019 | Sonnauer et al. | |

FOREIGN PATENT DOCUMENTS

| | | | |
|---|---|---|---|
| CN | 104417102 | 3/2015 | |
| CN | 104441965 | 3/2015 | |
| CN | 105313500 | 2/2016 | |
| CN | 105856874 | 8/2016 | |
| DE | 102012209305 | 12/2013 | |
| DE | 102014112482 | 3/2016 | |
| DE | 102014116201 | 5/2016 | |
| DE | 102014116201 A1 * | 5/2016 | ............ B41J 3/4073 |
| DE | 202016104631 | 9/2016 | |
| DE | 102015219975 | 4/2017 | |
| DE | 102016212521 | 1/2018 | |
| EP | 3196022 | 7/2017 | |

OTHER PUBLICATIONS

German Search Report dated Mar. 7, 2018 issued in corresponding German Application No. 102017120281.1.
Chinese Office Action dated Jul. 1, 2021 issued in corresponding Chinese Application No. 201880057100.4, with English translation.

* cited by examiner

APPARATUS AND METHOD FOR MONITORING PRINTED CONTAINERS

The present invention relates to an apparatus and method for monitoring printed containers, in particular for sequential monitoring of preferably multicolour printed containers, or for treating containers. From the prior art, devices and methods for direct printing onto containers are known. The advantages of direct printing lie in the free design of the labels. Firstly, so-called "no label look" labels are unnecessary, and secondly the present labels are subject to the restriction that they can only be applied onto a surface which, in processing, gives a flat and advantageously cohesive sheet. In contrast, with direct printing, for example a raised or embossed logo on a container or a spherical surface can be printed. Further designs are feasible. Thus today, the known helically turned or twist-shape containers can only be labelled with a sleeve—a plastic sleeve which is thermally shrunk onto the container—with the disadvantage that the embossed regions are "bridged" and hence the expressive power of the container form is weakened. Direct printing could bring its full advantages into play here.

If the container is printed for example by means of inkjet printing, it is easy to conceive that a new artwork or image element or printed image is loaded into the print head, similarly to an office printer. For this, the print head requires so-called RIP files which substantially determine the sequence and the droplet size for each individual printing nozzle in each of the possible printing colours. Because of the print resolution, the number of colours and the variable droplet size, the data quantities are considerable. A "just-in-time" supply with new printing data keeping step with the production rate would require a substantial increase in the bandwidth of the communication interfaces to the print heads. For example, a printing machine is to print an area of $70 \times 140$ mm$^2$ at 720 dpi, with a machine performance of 48,000 containers per hour, and normally with five colours (CMYK and white). Also, usually four droplet sizes are used. The area corresponds approximately to $2000 \times 4000$ dots. Each dot must be depicted in a respective colour channel, i.e. in total there are five colours×8 million dots per colour=40 million dots. If a dot is represented by one byte in the memory, then to describe a printing area of $70 \times 140$ mm$^2$, a memory of 40 MB is already filled with information. If the machine is printing 48,000 containers per hour (=15 Hz) and each artwork is designed individually, then for said printing area, printing data must be produced at 600 MB/s and transferred to the print heads continuously. A printing machine available on the market is expected to deliver continuous machine performance for eight hours, and preferably with 24/7 operation. If two areas per container are to be printed, each with a width of 70 mm and a height of 140 mm, then with a production rate of 48,000 containers per hour, continuously (on average) 1.2 GB/s must be calculated and transferred. The printing area is typical for home or healthcare products and given merely as an example. However, the calculation example illustrates the data quantity per second which must be provided promptly in the printing machine and supplied to the individual print heads.

Previously in the prior art, a different route has been taken: it is easier to keep a set of RIP files/information in each individual printing unit and apply these in a fixed sequence or optionally from container to container. Thus there is no need to provide a permanent data stream, and the benefit of high flexibility is achieved. It is not always necessary to store the entire artwork or label, but merely part (areas) may be replaced. For example, the front side of the product may always be the same, and the rear side may be designed with country-specific legal texts. A "four-colour filler" may be situated downstream, and four different "labels" may be printed, depending on flavour (banana, vanilla, strawberry, chocolate). For example, for a Champions League edition, the same label can always be printed and only the player images are changed. In the same way as an "alphabet soup", "statements" or cohesive images may also be produced over several containers, chess figures, dominoes (dots, pictures). The common feature of all said examples is that they contain a certain extent of different artworks or image elements or printed images or parts thereof, and hence a diversity is generated.

In the prior art, it is advantageous that the sequence can be controlled centrally. It may be that faults occur in further process steps up to delivery of the product, and one or more articles must again be (after-) produced. The most important successive process steps may be setting of the ink, monitoring of the printing (an actual defective print has been produced), or filling (a filling fault, closure fault), packing (fault during packing). In each process step, certain variants may be "lost" and require a targeted after-production thereof in the batch.

In the prior art, it is usual today that, in monitoring the printed container, a specimen, artwork or image element or printed image, known as the master print, is produced as a comparison template in the monitoring unit. In the first print run, an image element or printed image considered exemplary is selected as a reference image by copying in the monitoring system. If this master print is reused for a later batch and saved for this purpose, it is called a "golden master print" which is stored retrievably in the monitoring system in a non-volatile memory (HD, Cloud etc.). Today, it is usual that monitoring systems in the printing industry check against a (golden) master print. Naturally, different contents (banana, vanilla etc.) may be included on the master print, but not variably. The print sheet as a whole is constant. A further known method, which is used e.g. when printing packaging leaflets in black on white paper, is to check against a PDF file as a template. This excludes the step performed by human intervention (and possibly containing errors) of producing a master print with incorrect content and using this for printing. This means that the aim is to exchange the (golden) master print template for a PDF template. The PDF template is synonymous for all templates which were computer-calculated and produced, instead of being read back by the monitoring system e.g. as a camera image. In the prior art, so-called PDF files are changed between two printing batches. Furthermore, the term "master print" includes both the template generated by copying the reference printed image or reference image element, and also the PDF file or other file templates.

In the prior art, using the Nyquist sampling theorem, the master print may require twice the resolution in both directions, in comparison with the printing data. This means that, instead of 600 MB/s or 1.2 GB/s, communication traffic of 2.4 GB/s or 4.8 GB/s may occur.

In the prior art, usually various continuous checks are used, such as spot checking of colour deviations, for example by means of calibrated (delta E) or non-calibrated measurement.

In the prior art, it is usual to check text or text modules which are printed in a specific font. In a first step, this text is usually "broken down" or segmented into individual letters/digits, then identified via an OCR or OCV algorithm and checked against a defined content.

In the prior art, it is usual to keep several product types or variants of a product available and simultaneously check against all templates or a particular specification. This is for example known from a container sorting plant normally used in a bottle store. The actual specimen on the belt is checked against various specimen templates, such as "Euro" or swing-top beer bottle shape, and in brown, white or green glass. The actual specimen is classified and sorted via the best match. Or fruit is sorted e.g. by type, size, colour etc., in that it is checked against several or all templates and the best match used. With this procedure, "unknown" specimens can be identified and classified by comparison with several "templates".

In the prior art, the number of sequences can be controlled centrally. This is necessary to be able to produce an ordered quantity of sequences. For example, an order is given for production of 2000 advent calendars consisting of 24 containers with 24 different patterns. The 24 patterns are linked. In the simplest case, the digits 1 to 24 are applied. In the prior art, it is usual to print the sequence of 24 patterns until, at the last process step (packing of the advent calendar), 2000 sets are provided or can reliably be achieved.

The number of sequences in this example is 2000. In practice, around 5% more are produced if the expected production fault rate is around 5%. This exemplary 5% is the total of all possible faults in all process steps of production. I.e. instead of the ordered 2000 sequences, a planned overproduction of 2100 sequences is automatically produced in the factory, in order to get 2000 sequences at the end. Only complete sets of advent calendars may be supplied. If a fault occurs on a container at one process step, the complete sequence must be excluded and later reorganised with the overproduction.

The most important process steps may be the actual printing, setting of the inks, monitoring of the printing (an actual defective print has been produced or a different print was expected), filling (a filling fault, closing fault), packing (fault in packing). In each process step, certain variants may be excluded or "lost", and targeted after-production thereof is required in the batch.

The overproduction of the additional 100 sequences could be tolerated, but this approach is extremely inefficient if, instead of 2000 sequences, a substantially smaller sequence must be produced, e.g. 10 sequences. Here the question arises of what overproduction level should be set. For 10 sequences, in the above example a total of 240 containers are produced; with a rejection rate of 5%, a loss of 12 containers could be expected. In the worst case therefore, 12 containers would be unusable. The probability that 12 different patterns are concerned is very low. With the prior art, most likely two, for a process fault concerning just one pattern, or up to ten additional sequences would have to be produced. In relation to the quantity ordered, this constitutes an overproduction of 20%-100%. The problems are not only the unnecessary use of materials and product, but also the complexity must be taken into account.

The devices and methods currently known in the prior art have the disadvantage that checking is performed against the fixed master print, wherein it is irrelevant whether the master print is produced by reading back a print or synthetically generated from a file. Here the monitoring system has no flexibility for keeping step with the flexibility of the container printing machine.

The disadvantage is that the master print is changed between two print batches. If the master print is changed just in time, a continuous and costly data stream is required. This is costly since a very large quantity of data per second is required and the infrastructure must have very high availability.

The disadvantage is that at the same time, checking is performed against more than one master print. Thus e.g. in the following example, it cannot be distinguished whether the print is correct or incorrect: a container must be produced both with the text "color" for the American region and also "colour" for the English region. In the prior art, the monitoring system loads both (partial) artworks or image elements or printed images. The one template will always generate an "OK" and the other template a "not OK". It remains unclear which version should have been produced for the monitored container. A further example is the list of ingredients on the back of the container, for example in the "4-colour filler", the front side could be printed with the "vanilla" artwork/printed image/image element, and the back with the ingredients list of chocolate. On this basis, it cannot be concluded in the prior art whether the front or the back is incorrect, or whether the printing process should have produced a "strawberry" container and the print heads have been switched further internally with the wrong step width.

The present invention is based on the object of overcoming the disadvantages known from the prior art and providing a flexible printing apparatus or monitoring apparatus which responds variably to any faults, in which however the data quantity to be transmitted during operation (e.g. of a printing process) remains within an acceptable size range.

The object is achieved according to the invention by the subjects of the independent claims. Advantageous embodiments and refinements of the invention are the subject of the subclaims.

A monitoring device according to the invention for monitoring a plurality of containers which have been printed with at least one first image element by a direct printing machine, has a transport device which supplies and/or discharges the printed containers to be monitored along a predefined transport path, in particular individually and successively, to the monitoring device, wherein the monitoring device monitors the printed containers at least with respect to the first image element applied by the direct printing machine, and has a memory device which stores at least one set of first image elements to be monitored.

According to the invention, for each container to be monitored, the monitoring device carries out monitoring taking into account at least one image element to be monitored which is uniquely assigned to this container from the set of first image elements to be monitored. In other words, the first image element applied to the container to be monitored is not compared with all individual first image elements from the set of first image elements to be monitored, as was usual in the prior art, but precisely (and exclusively) with the first image element (from the set of first image elements) which was to be applied to the container by the direct printing machine. Preferably therefore, in particular the container to be monitored is monitored by the monitoring device not with respect to at least one image element from the set of first image elements to be monitored and stored in the memory device.

Preferably, a conveyor belt is used as a transport device. The transport device may comprise holding means for holding and/or gripping the containers and/or for sequential or individual transport of the containers, and/or preferably a delay device which influences (enlarges or reduces) the spacing between successive transported containers. Furthermore, the transport device is preferably suitable and intended for transporting, preferably successively, at least 10,000, preferably at least 20,000 and particularly preferably at least 40,000 containers per hour. Preferably, the monitoring device is suitable and intended for monitoring at least 10,000, preferably at least 20,000 and particularly preferably at least 40,000 containers per hour.

Preferably, the containers are (hollow and) unfilled containers. Preferably, they are glass containers and/or plastic containers made of PET, PP or PE. Both cylindrical containers and shaped bottles may be printed. Furthermore, the plurality of containers may preferably be a plurality of identical containers, i.e. containers of the same type and/or same size. Preferably, the plurality of containers comprises comparatively small batches.

In an advantageous embodiment, the monitoring device is suitable and intended for undertaking, at least for a container to be monitored, a change in assignment of an image element stored in the storage device for this container. This offers the advantage of flexible response to the detection of an incorrectly treated, e.g. incorrectly printed container. Preferably, a container which initially was to be printed with a predefined first image element is, due to the change of assignment, printed with the first image element corresponding to the faulty container and then (by the change in assignment) also monitored for this first image element by means of the monitoring device.

In a further advantageous embodiment, the change in assignment takes place without transmission or transfer of an image element (to the memory device, preferably of the monitoring device). In other words, the image information of the image element is not transmitted, but the image elements are already (completely) stored in the memory device (of the monitoring device and preferably also the direct printing machine), and the image element concerned is preferably (merely) re-integrated into the sequence or succession of (first) image elements to be monitored, or integrated at another point in the sequence of (first) image elements to be monitored. This offers the advantage that the data quantity to be transferred can be kept as small as possible, because the data quantity concerning the image content need not be transferred (to the memory device) but merely the information on where the image element concerned should be integrated in the sequence of predefined image elements.

Preferably, the apparatus comprises an interaction device which is suitable and intended for—preferably without interrupting operation (in particular operation of the direct printing machine and/or the monitoring device)—changing the predefined sequence of image elements to be printed by at least the first printing assembly of the printing device or direct printing machine (and/or the predefined sequence of first image elements stored in the monitoring device and to be monitored), and/or modifying the set of image elements stored in the memory device of the printing assembly, wherein for this preferably no information concerning the image content is transferred but preferably merely a (modified or new) arrangement in the (predefined) sequence of first image elements to be printed, and/or data characteristic of a number indicating how often a specific container or specific container type is supplied (in order) to the printing device or direct printing machine, and/or how often a container is to be printed with the same first image element, and/or preferably information on an absolute or relative arrangement at which a specific container type is situated in the supply of the plurality of containers (relative to other container types), and/or information on an absolute or relative arrangement at which a predefined first image element is situated relative to at least one further first image element.

In a further advantageous embodiment, the interaction device comprises an element which is selected from a group comprising a digital line, a plurality of digital lines, one or more higher value hardwired interface(s) such as for example a serial bus (e.g. CAN, Profibus, USB, RS232, RS485 etc.), a network-based bus (preferably Ethernet, Ether CAT, ProfNet, Powerlink and/or DeviceNet etc.), one or more wireless communication connection(s) (BlueTooth, NFC and/or WLAN etc.), and combinations thereof.

In a further advantageous embodiment, the set of first image elements to be monitored to contains fewer than 200, preferably fewer than 100, preferably fewer than 90, and particularly preferably fewer than 80 image elements. A quantitative restriction of the number of (first) image elements (to be monitored) offers the advantage of keeping the necessary memory size of the memory device in which these are stored as small as possible. Despite this however, with the variability in these image elements achieved by the proposed invention, a high flexibility or adaptation facility is offered.

In a further advantageous embodiment, the set of first image elements to be monitored is stored in the memory device (of the monitoring device) (and/or the first image elements to be printed are stored in the memory device of the direct printing machine) in a raster graphic format, or preferably as an RIP file. It would however also be conceivable that the (first) image elements (to be monitored) are (each) stored in vector graphic format (in the memory device) of the monitoring device, and preferably converted into a raster graphic format in the monitoring device. The image elements may here be present or stored in the memory device as PDF files and/or as raster print files. It is thus conceivable that the monitoring device monitors against (at least) one PDF file as a template.

In a further advantageous embodiment, a sequence of image elements stored in the memory device may be predefined for the monitoring device, wherein the monitoring device monitors successive containers to be monitored with respect to the respective image element according to this predefined sequence, and a change in this sequence preferably takes place without transmission of the at least one modified image element.

In a further advantageous embodiment, via a change in the predefined sequence, a number of stored image elements indicating how many containers to be monitored, in particular directly succeeding each other, are monitored with respect to this image element, can be changed. This offers the advantage that, in the case that a container with a specific image element is deemed defective, this container can be flexibly after-produced by a change of this number in the sequence.

In a further advantageous embodiment, the monitoring device comprises an inspection device for detecting, at least in portions, at least one image element arranged on a container to be monitored, wherein the monitoring device performs the monitoring taking into account a recorded image of the least one image element portion it has detected.

In a further advantageous embodiment, the monitoring device carries out at least one monitoring step depending on the container to be monitored. The monitoring device may select a monitoring step e.g. depending on the container type to be monitored or depending on a specific image element applied to the container to be monitored.

In a further advantageous embodiment, the monitoring device is suitable and intended for selecting and carrying out, depending on the container to be monitored, preferably depending on a container detected by the monitoring device, one of at least two monitoring templates (or monitoring processes) which differ from each other in at least one process step. According to the present container to be monitored, therefore, a monitoring process may be applied which is adapted thereto. This offers the advantage that, by choice of a monitoring process adapted to or optimised for an individual container, a time saving or saving in computing or analysis power is possible. Preferably therefore, the monitoring system or monitoring device carries out certain monitoring steps or monitoring processes depending on the specimen or container to be monitored. Thus it is conceivable that, in the program sequence of the monitoring system or monitoring device, in particular various process paths are provided which are preferably followed depending on the specimen or container to be monitored.

In a further advantageous embodiment, the monitoring device is suitable and intended for carrying out a specialised monitoring process depending on at least one predefined parameter.

In a further advantageous embodiment, it is derived from the predefined parameter which monitoring step or monitoring process should be performed, and/or which portion of the container to be monitored is monitored and/or inspected, and/or which comparison is performed. Thus for example only a (smaller) region of an image element, which is however characteristic thereof, is used for monitoring. For example, a region or extract of an image element may be selected which is particularly rich in contrast and/or in which all print colours of the image element have been used, or from which it can already be assessed whether a print has been applied correctly (at the correct position and with the correct colour application) to the container. Preferably, with the master print or an image element or at least one image element and preferably each image element of the set of image elements to be monitored, further information is supplied and/or packeted which for example contains information on the specialised controls or specialised monitoring processes or monitoring steps. In the simplest case, these may be parameter sets suitable for the specialised monitoring. The parameter sets or the process paths preferably determine whether, where and what is checked or monitored preferably by the monitoring device. Specialist controls or specialist monitoring processes are preferably selected from a group of monitoring processes which include colour checking, colour deviation checking, OCR/OCV checking, a 1D/2D code check for content and/or quality parameters, checking of (at least) one offset of different layers (wherein typically the colour layers are CMYK and white), or image elements and combinations thereof.

Advantageously, the additional information now specifies whether, where and which colours are checked with which limits. Or whether, where and which text is classified by OCR/OCV. So it is now clear whether and where, in addition to the usual image element comparison or printed image comparison, further checking steps are determined, e.g. colour dot determination, 1D or 2D code checking for content and/or quality, etc. This may be structured differently—with a view to improving flexibility—for each container in the container stream.

In a further advantageous embodiment, the monitoring device, depending on the result of the monitoring it has performed on a container to be monitored, transmits a signal to at least one container treatment device which is preferably arranged upstream in the transport direction of the containers, preferably a direct printing machine.

The present invention is furthermore directed at a method for monitoring a plurality of containers which have been printed with at least one first image element by a direct printing machine, wherein the printed containers to be monitored are supplied and/or discharged by means of a transport device along a predefined transport path, in particular individually and successively, to at least one monitoring device, wherein the monitoring device monitors the printed containers at least with respect to the first image element applied by the direct printing machine.

According to the invention, a memory device contains at least one set of first image elements to be monitored, wherein for each container to be monitored, the monitoring device undertakes a check of the arranged image element taking into account at least one image element to be monitored and uniquely assigned to this container from the set of first image elements to be monitored.

The apparatus described above is in particular suitable and/or provided for carrying out this method, i.e. all features specified for the apparatus described above are also disclosed for the method described herein and vice versa.

In an advantageous embodiment, a change is made to the image element assigned to a container to be monitored, with respect to which this container is to be monitored, via a change in assignment and without transmission of an image element.

In a further advantageous embodiment, the selection of image element to be monitored is predefined by the direct printing machine depending on the printed image element.

In a further advantageous embodiment, the image element to be monitored is stored in the memory of the monitoring device.

In a further advantageous embodiment, the set of first image elements to be monitored contains fewer than 200, preferably fewer than 100, preferably fewer than 90 and particularly preferably fewer than 80 image elements.

Preferably in addition, and particularly preferably arranged upstream in the transport direction of the containers, an apparatus for preferably sequential and preferably multicolour printing of a plurality of containers may be provided, which comprises a transport device which supplies and/or discharges the containers to be printed along a predefined transport path, in particular individually and successively, to a printing device or direct printing machine with at least one printing assembly and preferably at least two printing assemblies, with a first printing assembly which prints the containers sequentially with at least one first respective image element that is selected from a predefined set of first image elements stored in a memory device of the first printing assembly, according to a predefined sequence of first image elements to be printed, and preferably with a second printing assembly which prints the containers already printed with the at least one first image element, preferably sequentially, with at least one respective second image element that is selected from a predefined set of second image elements stored in a memory device of the second printing assembly, according to a predefined sequence of second image element to be printed. Preferably therefore, a sequence of (first or second) image elements is predefined—or this is preferably stored in a memory device—in which the (first or second) image elements (as a printed image) are applied to successive containers. The stored (first or second) image elements may be applied (in one printing process) by (at least) one printing assembly alone or in combination with at least one further (first or second) image element (as a printed image) onto a container to be printed. The applicant reserves the right to claim such an apparatus for printing a plurality of containers individually or in combination with a monitoring device and/or a feature described in connection with the monitoring device, individually or in combination.

Preferably, the apparatus for printing a plurality of containers comprises an interaction device which is preferably suitable and intended for changing the predefined sequence of image elements to be printed by a least one printing assembly and preferably by at least two printing assemblies (and preferably all printing assemblies) of the printing device or direct printing machine, and/or modifying the set of image elements stored in the memory device of a respective printing assembly. The use of the interaction device advantageously offers the possibility of using variable image data. Thus for example the interaction device may change the order of mutually differing image elements with which the containers are to be printed, or exchange an image element for a new image element. A change of sequence of image elements to be printed preferably also means not only a change in the order in which the image elements or composed image elements (as a printed image) are applied or printed successively onto the containers to be printed, but also that although the "database" of image elements from which the image elements are selected remains the same, the sequence of printed images, consisting of image elements or composed image elements which are applied successively to the containers to be printed, is changed. Thus for example if the set of image elements (to be printed) contains three different labels or image elements which, for the sake of clarity, are called A, B, C, and firstly two containers are to be printed with image element A and then the following three containers with image element B and the following container with image element C, then the interaction device can change the sequence of image elements to be printed in that e.g. also (only) the number of containers to be printed with a specific image element, in this example image element B, is changed. In said example, the interaction device may make changes such that firstly, again, two containers are printed with image element A, then the following four containers with image element B and the following container with image element C.

A set of (first or second) image elements means at least one (first or second) image element and preferably a plurality of (first or second) image elements. The set contains preferably fewer than 200, preferably fewer than 100, preferably fewer than 90 and particularly preferably fewer than 80 mutually different (first or second) image elements. A quantitative restriction of the number of (first or second) image elements offers the advantage that the necessary memory size of the memory device(s) in which they are stored can be kept as small as possible. Despite this, the variability of these image elements achieved by the proposed invention, in particular by the interaction device, offers a great flexibility or adaptation facility. Preferably, each of these (first or second) image elements is applied by the printing device or the direct printing machine as a printed image onto at least one of the containers to be printed. Preferably, the image elements are (each) stored in a raster graphic format or preferably as an RIP file in a memory device of the printing device or direct printing machine or printing assembly of the printing device or direct printing machine. It would however also be conceivable that the image elements are stored in a vector graphic format, and preferably converted into a raster graphic format in the printing device or direct printing machine.

Preferably, the printing device or direct printing machine has more than two printing assemblies. Preferably, a set of image elements is stored for each printing assembly. The features or advantageous embodiments, if the respective set of image elements is not specified further, may be applied to some (preferably however not all) of the printing assemblies of the printing device or direct printing machine, particularly preferably however to all printing assemblies of the printing device or direct printing machine.

The phrase "modifying a set of image elements" preferably means that for example this is extended by at least one, preferably by precisely one image element, and particularly preferably by at least two image elements, and/or reduced by at least one, preferably by precisely one image element, and particularly preferably by at least two image elements.

Additionally or alternatively, this furthermore means that at least one or several image elements may be changed. In the above-mentioned example, the image element C may be replaced by a new image element D, and the set of image elements (to be printed) may now consist of image elements A, B and D.

As explained initially, the proposed apparatus is particularly suitable and intended for direct printing onto containers with three-dimensionally differently shaped or configured surfaces, wherein the container may preferably comprise surface structures such as grooves, protrusions and/or other three-dimensional ornaments.

In an advantageous embodiment, the printing device is a direct printing device or direct printing machine which directly prints the containers by means of its printing assemblies, in other words preferably ink is applied directly onto the container surface, and particularly preferably not onto a label. Preferably, the printing device or direct printing machine or at least one printing assembly of the printing device or direct printing machine, and particularly preferably all printing assemblies of the printing device or direct printing machine, is/are suitable and intended for carrying out an all-round printing of the container to be printed. Preferably, the printing device or direct printing machine or at least one printing assembly of the printing device or direct printing machine, and particularly preferably all printing assemblies of the printing device or direct printing machine, is/are suitable and intended for a digital printing process. Preferably, a type-dependent automatic adjustment of the printing assemblies or printing device or direct printing machine takes place, particularly preferably depending on (at least one) (stored) set of image elements or predefined sequence of image elements to be printed. The type-dependent adjustment may however also take place depending on a container type.

Preferably, the printing device or direct printing machine is suitable and intended for printing at least 10,000, preferably at least 20,000 and particularly preferably at least 40,000 containers per hour.

In a further advantageous embodiment, the apparatus for printing a plurality of containers or the interaction device is suitable and intended for—without interrupting the printing operation of at least one printing assembly, and in particular during a printing process of this printing assembly—changing the predefined sequence of the (successive) image elements to be printed by this printing assembly or by at least the first printing assembly of the printing device or direct printing machine, and/or modifying the set of image elements stored in the memory device of a respective printing assembly. For this, preferably no information concerning the image content is transmitted, but merely a (modified or new) arrangement in the (predefined) sequence of first image elements to be printed, and/or a number which for example is characteristic of a number indicating how often a specific container or specific container type (in succession or within a batch) is supplied to the printing device or direct printing machine, and/or preferably information which is characteristic of an absolute or relative arrangement at which a specific container type is situated in the supply of the plurality of containers (relative to other container types). Preferably, the apparatus is suitable and intended for—without interrupting the container transport by the transport device—changing the predefined sequence of image elements to be printed, in particular for the containers not yet supplied by the transport device to the printing device or the direct printing machine, and/or modifying the set of image elements for these containers not yet supplied. It may be advantageous that the interaction device only changes the printing with effect from the containers which are later than the fifth following, preferably than the tenth following and particularly preferably than the 50th following container supplied to the printing device or direct printing machine.

In a further advantageous embodiment, the interaction device is suitable and intended for undertaking, in at least one printing assembly, a modification of the set of image elements stored in its memory device and/or a change in the predefined sequence of image elements to be printed, without transmission of an image element to the printing device or direct printing machine or memory device. In other words, the image information of the image element need not be transmitted but is already stored in a memory device, and the image element concerned is preferably (merely) re-integrated into the sequence of image elements to be printed or integrated at a different location in the sequence of image elements to be printed. This offers the advantage that the data quantity to be transferred can be kept as small as possible because there is no need to transfer the data quantity concerning the image content, but merely the information on the location in the sequence of predefined image elements at which the image element concerned must be integrated.

In a further advantageous embodiment, the monitoring device and/or the printing apparatus is configured to construct a communication connection with an external network (Internet and/or intranet) and via this communication connection, preferably via the interaction device, receive instructions concerning the image elements stored in the memory device of the monitoring device and/or a printing assembly. These instructions may concern a change in predefined sequence of image elements to be monitored and/or printed, and/or the set of image elements (to be monitored and/or printed). Thus it is possible for example to change image elements on-line and/or modify the set of image elements (to be monitored and/or printed) on-line. This offers the advantage that the control of the monitoring device and/or the printing device or direct printing machine can be integrated into an (existing) network.

In a further advantageous embodiment, in response to the received instructions, the sequence of image elements to be printed in at least one stored set of image elements of at least one printing assembly, and/or at least one image element of at least one stored set of image elements of at least one printing assembly, can be modified. Preferably, this is also carried out without transmitting the image element itself.

In a further advantageous embodiment, the interaction device is suitable and intended for changing, preferably on at least three printing assemblies, in particular substantially simultaneously and in the same fashion, the sequence of sets of image elements to be printed which are stored in the respective printing assembly, and/or modifying in the same fashion the set of image elements to be printed which is stored in the respective printing assemblies, and/or modifying in the same fashion the stored set of (first) image elements to be monitored (or their sequence or the assignment of these image elements to the containers) in the monitoring device. Preferably, such a simultaneous change or modification performed in the same fashion takes place such that these changes or modifications act on the same container or containers to be printed, and preferably also on the same container to be monitored which is already printed.

In a further advantageous embodiment, at least two printing assemblies and preferably all printing assemblies of the printing device or direct printing machine, print the containers to be printed with at least two, preferably at least four, and particularly preferably precisely four mutually different image elements, of which at least one image element is applied to several successive containers and at least one image element is varied with respect to successive containers. The variation can preferably be controlled or influenced via the interaction device. Also, a printed image applied by a printing assembly may be composed of several image elements. In other words, the printing device or direct printing machine is configured such that the containers can be provided with different printed images in the same region.

Preferably, at least one filling device for filling the printed containers is arranged downstream of the printing device or direct printing machine, and particularly preferably also a monitoring device (arranged after the printing device or direct printing machine), in the transport direction of the containers. Preferably, the filling device is suitable and intended for filling the containers with different filling contents depending on the different printing. Preferably, the filling device may fill the containers with at least two, preferably at least four, and particularly preferably precisely four different filling contents or beverages. The filling device may also have access (preferably via the network device) to the predefined sequence of image elements to be printed or to the set of image elements to be printed and/or to the set of (first) image elements to be monitored by the monitoring device. This information may however also be stored in a memory device of the filling device and/or be transmitted to the filling device by an interaction device.

In a further advantageous embodiment, the first and second printing assembly, and in particular the respective printing assemblies of the printing device or direct printing machine, print the containers in precisely one colour which differs from the printing colours of the respective other printing assemblies. Preferably, the visible/visual colour spectrum can be covered with the printing colours of all printing assemblies. Preferably, at least one printing assembly of the printing device or direct printing machine, and particularly preferably all printing assemblies of the direct printing machine, use an ink which hardens under UV light irradiation. Preferably, the printing device or direct printing machine has at least (preferably precisely) five printing assemblies which preferably each use a different printing colour, which particularly preferably is selected from a group of five colours containing CMYK and white. Preferably, up to six different colours can be applied by the printing assemblies. Preferably, at least one printing assembly, particularly preferably all printing assemblies is/are suitable and intended for applying more than one droplet size, preferably more than two, preferably more than three and particularly preferably four different droplet sizes onto the object to be printed.

In a further advantageous embodiment, the printing device or direct printing machine has at least three, preferably at least four, preferably at least six and particularly preferably at least 15 printing assemblies, and fewer than 25, preferably fewer than 20, preferably fewer than 19, preferably precisely 18, preferably fewer than 7, preferably precisely 6 printing assemblies or print heads. Preferably, the number of active printing assemblies depends on the container height or printing height. Preferably, for a container height or printing height of up to 10 cm, (up to) six printing assemblies or print heads are used, and for a container height or print height of about 20 cm, (up to) 18 printing assemblies or print heads.

The present invention is furthermore directed at a method for sequential and preferably multicolour printing of a plurality of containers, wherein the containers to be printed are supplied and/or discharged by a transport device along a predefined transport path, in particular individually and successively, to a printing device or direct printing machine with at least two printing assemblies, wherein the containers are preferably sequentially printed by a first printing assembly with a respective at least one first image element, which is selected from a predefined set of first printing elements stored in a memory device of the first printing assembly according to a predefined sequence of first image elements to be printed, and wherein the containers already printed with at least one first image element are sequentially printed by a second printing assembly with a respective at least one second image element, which is selected from a predefined set of second image elements stored in a memory device of the second printing assembly according to a predefined sequence of second image elements to be printed.

Thus in the context of the method according to the invention, it is proposed that the given sequence of image elements to be printed by at least two printing assemblies of the printing device or direct printing machine is changed via an interaction device, and/or the set of image elements stored in the memory device of a respective printing assembly is modified by an interaction device. Here, the method may have all features or all feature combinations described in connection with the device, and vice versa.

In an advantageous embodiment, without interrupting the printing operation of the printing assembly and in particular during a printing process of this printing assembly, the predefined sequence of image elements to be printed successively by this printing assembly is changed via the interaction device, and/or the set of image elements stored in the memory device of a respective printing assembly is modified via the interaction device.

Preferably, at least one set of first image elements to be monitored and/or at least one set of first image elements to be printed, and preferably also the set of second image elements be monitored and/or printed, and particularly preferably the sets of image elements to be printed by all printing assemblies, or a superposition of these sets of image elements, are stored in the memory device of the monitoring device, wherein the monitoring device monitors the image element or printed image taking into account the set of (first) image elements or printed images to be printed and/or monitored and stored in the memory device. The memory device is in particular a non-volatile data memory such as an HD or Cloud.

Preferably, the monitoring device may determine a value which can be evaluated (in particular by a user) in order to determine, or on the basis of which it can be decided, whether the print applied by the printing device or direct printing machine has been correctly printed, and/or whether the image element arranged on the container to be monitored is correctly arranged and/or corresponds to the image element to be arranged or printed. Preferably, the monitoring device carries out a spot check of colour deviations, for example by means of calibrated (delta E) or non-calibrated measurement.

Preferably, the set of image elements to be monitored corresponds to a set of image elements to be printed or a set of superposed image elements which originate from the sets of different printing assemblies. It is however also conceivable that the set of image elements be monitored is derived from a set or several sets of image elements to be printed (preferably by computer). Thus a surface curvature of the container to be printed may be taken into account, and included as a distortion of the image element detected or to be detected by an inspection device arranged on the container to be monitored.

It is however also possible that the set of image elements to be monitored and stored in the memory device of the monitoring device is produced from or consists of a (or a set of) pictures, preferably taken by an inspection device (camera) of the apparatus or the control device, of an image element arranged on a container. It is therefore also conceivable that the monitoring device performs the monitoring taking into account a recorded image of at least one portion of the container to be printed.

In an advantageous embodiment, for each container to be monitored, the monitoring device undertakes a monitoring of the arranged image element taking into account an image element which is preferably uniquely assigned to this container to be monitored, or a composition of image elements to be monitored, which is preferably uniquely assigned to this container, from the set of (first) image elements to be monitored.

It is therefore proposed that a sufficient number of master prints or image elements or printed images is loaded or stored in the monitoring device. A sufficient number of master prints or printed images means that all prints or image elements or printed images to be produced in the immediate future are loaded or stored in the monitoring device as stock master prints or images or printed images. It is advantageous that this achieves the same flexibility as in the printing apparatus. Thus several master prints or printed images may be stored in the monitoring system in advance and processed in step with the production rate of the container printing apparatus or printing device or direct printing machine.

Preferably, the specimen or the (printed) container to be monitored by the monitoring device is checked against a defined selection of master prints or image elements or printed images. A defined selection of master prints or image elements or printed images preferably means that the printed container is monitored against a set, in particular unique, of master prints or image elements or printed images. A unique set of master prints or printed images or image elements can only contain a single template (of printed images or image elements) covering the entire print, or also composed templates (of printed images or image elements).

In a further advantageous embodiment, the apparatus comprises an interaction device which is suitable and intended for changing the predefined sequence of image elements to be printed by at least two printing assemblies of the printing device or direct printing machine, and/or for modifying the set of image elements stored in the memory device of a respective printing assembly. Preferably, the apparatus or the interaction device is suitable and intended for making changes or modifications in the monitoring device in corresponding fashion, i.e. in a manner corresponding to a change, made or performed or to be made or performed in the printing device or direct printing machine, in the predefined sequence of image elements to be performed, and/or a modification of the set of image elements to be printed.

In a further advantageous embodiment, the apparatus comprises an interaction device with a communication connection between the printing device or direct printing machine and the monitoring device, in particular between the memory device of at least one printing assembly (preferably between the memory devices of all printing assemblies of the printing device or direct printing machine), and the memory device of the monitoring device. Preferably, via the communication device, changes to the predefined sequence of image elements to be printed and/or image elements to be monitored can be preferably mutually compared. Preferably, the apparatus is suitable and intended for in particular, via the communication device, enabling a (higher-level) printing process to change the sequence of stored printed images/master prints or the predefined sequence of stored image elements both by the printing device or direct printing machine and its printing assemblies, and also by the monitoring system or monitoring device. It is conceivable that the higher-level system or higher-level printing process also adjusts the temporal and/or local offset between the generation of the printed image and the monitoring of the image element or printed image. It is also conceivable that this adjustment is guaranteed or undertaken by the monitoring system or monitoring device.

It is advantageous that no extremely complex communication interfaces or communication connections are required for loading the new master prints or new printed images or image elements just in time. Thus the communication interface need not have high availability, e.g. with suitable interface protocols, it can detect communication errors and correct these autonomously by repeated transmission of the corrupt packets, as in conventional network protocols for example. In a further advantageous embodiment, the monitoring device performs a monitoring of at least one image element or printed image of a container to be monitored, taking into account precisely one image element or printed image of the set of first image elements or printed images to be printed which are stored in the memory device.

Preferably, monitoring is thus performed against a unique set of master prints or image elements.

It is advantageous that each specimen or each container to be monitored is checked against a unique master print (set) or unique image element or printed image (from a set of image elements). Thus it can now safely be distinguished whether, with reference to the example cited initially, the specimen should contain the word "color" or "colour". It is advantageous that it is clearly checked in each case whether e.g. the back of the container should contain the chocolate ingredients list.

Preferably, the master prints or the image elements to be monitored which are stored in the memory device can advantageously be changed on-line (via the network device or communication device), in particular during operation of the apparatus or printing device or direct printing machine and/or monitoring device. Here, master prints or image elements to be monitored which are not required in the immediate future (i.e. preferably for a predefined number of containers to be printed or monitored) can be unloaded (where present) and replaced or loaded by those which are required in the immediate future. Preferably, in parallel, monitoring can take place against the presently necessary prints or image elements for the present containers (preferably situated in the monitoring device and to be monitored).

Preferably, viewed in the transport direction of the containers, the following container treatment devices are arranged downstream of the printing device or direct printing machine: a setting device in which the inks applied to the containers to be printed by the printing device or direct printing machine are hardened, preferably by UV irradiation; and/or the monitoring device for monitoring the print applied to the container by the printing device or direct printing machine, wherein preferably it is monitored whether a defective print has been produced; and/or a filling device which fills the printed containers; and/or a closing device which closes the containers; and/or a packing device which packs a container or several containers.

In a further advantageous embodiment, depending on the result of the check performed by the monitoring device on a container to be monitored and/or by a (further) monitoring device of a container treatment device preferably arranged downstream of the printing device or direct printing machine, at least one signal is transmitted to the printing device or direct printing machine. Such a signal may be provided to transmit information that a specific container, which may have been classified as defective and/or which has been and/or will be removed or ejected from the further treatment process, must be produced again. Such a fault may occur in further process steps up to delivery of the product. Preferably, in response, a (flexible) after-production may take place by means of a change in the sequence of the image elements to be printed and/or modification of the stored set of image elements in one or more, preferably all of the printing assemblies of the printing device or direct printing machine (and particularly preferably in all following e.g. type- or sort-dependent container treatment devices). The faults may for example be production of a defective print by the printing device or direct printing machine, and/or a filling fault by the filling device, and/or a closing fault and/or a packing fault. In each process step, certain (container) variants may be "lost", and require targeted after-production thereof (preferably in the batch). In particular, such flexible after-production is advantageous for small batches.

In a further advantageous embodiment, in response to the (at least one and preferably several) signal(s) transmitted, the predefined sequence of image elements to be printed by at least one printing assembly (preferably by all printing assemblies concerned) of the printing device or direct printing machine may be changed, and/or a set of image elements stored in the memory device of at least one printing assembly and preferably all printing assemblies (concerned) may be modified. This change and/or modification preferably provokes after-production of at least one container which has been identified as defective or unusable.

The flexibility of the monitoring is advantageous. Compared with a rigid sequence (of printed images or image elements) defined a priori, the monitoring system may be adapted to the actual requirements. If e.g. a container is identified as unusable in later process steps which follow printing, this information can be fed back to the printing process for individual after-production.

Preferably, the apparatus comprises a sorting device which, viewed in the transport direction, is particularly preferably arranged downstream of the printing device or direct printing machine and/or monitoring device, and which classifies or sorts the containers into different transport lines according to their type or container size or container nature. Preferably, the printing device or direct printing machine can print containers of different types. The sorting device may therefore sort the containers for example depending on a different image element or print applied or characteristic of this container.

Preferably, a monitoring device may be arranged in the printing device or direct printing machine, preferably inside a housing of the printing device, wherein preferably the print is monitored in the printing device or direct printing machine, and/or a monitoring device may be arranged downstream of the printing device or direct printing machine viewed in the transport direction of the containers, and preferably arranged on the conveyor belt or transport device, wherein the print can then preferably be monitored "on the line" after the printing device or direct printing machine, and/or a (further or alternative) monitoring device may be arranged in its own, preferably fixedly installed inspection apparatus.

The present invention is furthermore directed at an apparatus for treating containers with at least a first container treatment device which is suitable and intended for providing the containers to be printed with different decoration, and provides the containers to be treated with a decoration provided according to a predefined decoration sequence, having a transport device which supplies and/or discharges the containers treated by the first container treatment device along a predefined transport path, preferably individually and successively, to at least one monitoring device for monitoring the treated containers.

According to the invention, the monitoring device is suitable and intended for monitoring the containers at least with respect to the decoration applied by the first container treatment device, and depending on the monitoring result to undertake and/or arrange a change in the predefined decoration sequence of at least the first and/or a second container treatment device, preferably of a printing device and/or a direct printing machine. The apparatus for treating containers may be equipped with the features described in connection with the monitoring device (or method) described above and/or the apparatus (or method) described above for printing a plurality of containers, individually or in combination, and vice versa.

Preferably, the decoration is a product-specific decoration which in particular indicates amongst others the product which the container is to receive. The decoration may, additionally or alternatively, also contain in particular product-independent series information, such as a series-specific colour and/or number, and/or a series-specific pattern. The decoration may for example be a pattern which is preferably applied by a direct printing machine as a print onto the container, a closure for the container which can be selected in a specific colour, or a label which is applied to the container. In a broader sense, the decoration may also be the product to be filled, such as a predefined flavour variant with which the container is to be filled by the filling device.

The proposed apparatus offers the advantage that, e.g. as soon as the printing device or direct printing machine can print in targeted fashion individual patterns or decorations from a sequence of patterns or decorations, there is no need to print a complete set in the sequence if only part thereof is required. The advantage becomes clearer, the smaller the run and the number of sequences. Printing errors which the printing device or direct printing machine itself can detect, such as container missing, container held askew, container twisted etc., can simply be after-produced by the printing device or direct printing machine.

In an advantageous embodiment, the monitoring device is suitable and intended for arranging, depending on the monitoring result, an after-production and/or intermediate production of at least one container, preferably with the decoration of the monitored container. In other words, the monitoring device is preferably suitable and intended, in the case that a monitored container is deemed not to meet requirements, to arrange, e.g. by transmission of a signal to a (central) control device, for identification of at least one and preferably all decorations with which the monitored container was to be equipped.

Preferably, it is also arranged (e.g. by the control device) that a (new) container is equipped with precisely this decoration and preferably with all these decorations.

In a further advantageous embodiment, via a change in the decoration sequence, a change is achieved in the number and order of the decorations to be applied to the containers by at least one first container treatment device, preferably by several container treatment devices, and particularly preferably by all container treatment devices which equip the containers with different decorations. Preferably, such a change in decoration sequence is achieved via a (central) control device and/or (at least indirectly) via the control device. Here, a decoration sequence in which the different decorations of a set are applied successively precisely once onto the containers, may be changed such that, according to the modified decoration sequence, two (preferably directly succeeding) containers are provided with the same decoration.

In a further advantageous embodiment, the at least one container treatment device and/or the at least second container treatment device is selected from a group of container treatment devices which comprises a direct printing machine, a transport device, a filling device, a closing device and a packing device (and/or a sorting device).

In a further advantageous embodiment, the monitoring device is suitable and intended for appending a further decoration to the predefined decoration sequence and/or for inserting a further decoration into the predefined decoration sequence.

In a further advantageous embodiment, the apparatus for treating containers comprises at least one printing device or direct printing machine which provides the containers with an image element or pattern provided according to the predefined decoration sequence, and the monitoring device is suitable and intended for undertaking and/or arranging a change in the predefined decoration sequence with respect to the image elements or patterns to be applied by the direct printing machine. Preferably, the direct printing machine or printing device is suitable and intended, particularly preferably like the monitoring device with respect to its monitoring of printing containers, to print in targeted fashion, instead of a fixed sequence of decorations or image elements or patterns, a specific pattern or decoration or image element from the set of decorations or image elements or patterns or from the decoration sequence onto a specific (fixedly assigned) container.

Preferably, a control device is provided, particularly preferably a central control device, which is suitable and intended for controlling the printing device or direct printing machine or at least one second (further) container treatment device, preferably all container treatment devices which provide the containers with different decorations, so as to provide the containers with a decoration they have predefined, e.g. so as to produce or print certain patterns or a certain decoration from a decoration sequence or sequence of patterns. Preferably, the control device is suitable and intended for controlling the number and order of patterns from the sequence of patterns, or the number and order of decorations from the sequence of decorations. If the printing machine or also a second (further, other) container treatment device, and preferably all container treatment devices involved in equipping a container with a predefined decoration, can be actuated to produce certain patterns from the sequence of patterns or equip the container with a specific decoration from the decoration sequence, then during production, strategies may be applied which allow optimal utilisation of the printing device or direct printing machine itself and the subsequent processing steps. Now for example, on detection of a printing fault by the monitoring device, the appropriate container can be immediately produced again. Without this possibility, it may perhaps have been necessary to exclude the incomplete partial series. The desired series is again completed with the procedure proposed. Preferably, alternatively, at the end of the production run, only the defective containers are produced again, so that once more preferably (almost) no overproduction occurs.

If the number and order of decoration can be controlled, in this way containers which suffer faults in production steps after the printing device or direct printing machine can be after-produced. Because of the topology, preferably the containers should not be after-produced only at the end of the entire print run, but immediately. If all faults are detected by the system along the successive production steps, these can be after-produced in targeted fashion and preferably immediately at the printing device or direct printing machine.

In a further advantageous embodiment, the monitoring device is suitable and intended for undertaking and/or arranging a change in the predefined decoration sequence with respect to the image elements to be applied by the direct printing machine without transmission of an image element to the direct printing machine. Preferably, it is thus proposed that a system detects technically the defective containers from the various process steps and, preferably in a suitable fashion, uses this information in the production process to cause the container printing machine or direct printing machine to after-produce the defective containers. The after-production of certain containers may take place at the end of the actual production or suitably during production. Preferably, the (central) control device is suitable and intended for transmitting a signal, which is characteristic of a specific decoration, to at least one treatment device and preferably to the treatment devices which provide the containers with the different features, without transmitting all (image) information of the decoration.

In a further advantageous embodiment, depending on the result of the monitoring performed by the monitoring device, a signal is transmitted to the direct printing machine, and in response to the transmitted signal, the predefined sequence of image elements to be printed by at least one printing assembly and preferably by two printing assemblies of the direct printing machine is changed (similarly), and/or a set of image elements stored in the memory device of at least one printing assembly and preferably of (at least) two printing assemblies is modified.

In a further advantageous embodiment, the apparatus (for treating containers) has an interaction device with a communication connection between the direct printing machine and the monitoring device, in particular between the memory device of at least one printing assembly and the memory device of the monitoring device. The interaction device may here be equipped with individual or combinations of features of the interaction device already described in connection with the monitoring device and/or the apparatus for printing a plurality of containers.

In a further advantageous embodiment, the apparatus (for treating containers) is suitable and intended for undertaking a predefined change to a predefined decoration sequence of image elements to be printed by at least one printing assembly, by corresponding modifications at both the direct printing machine and the monitoring device, in particular in similar fashion. Preferably (simultaneous) changes are made (in corresponding or similar fashion) to the predefined decoration sequence in all container treatment devices which provide the containers with different decoration.

In a further advantageous embodiment, the apparatus (for treating containers) and in particular the control device has a memory device in which is stored at least the predefined decoration sequence of the decoration to be applied by the first container treatment device to the containers to be treated. Preferably, all treatment devices which provide the containers with different decorations have at least one (own) memory device containing the decoration sequence and/or the information (such as image elements) concerning the different decorations.

Preferably, the apparatus for treating containers has at least one buffer device, such as an inlet buffer, which can be controlled by the control device such that, particularly preferably until arrival of at least one (uniquely) predefined (after-produced) container, at least one container is not transported on or is retained. Preferably, the container which is not transported on or which is retained is at least one container provided with a further decoration, the decoration of which differs from the decoration of the container which has been after-produced or treated again. Preferably, this may ensure that, despite the exclusion of defective containers of a decoration sequence, at least the buffer device can always provide at least one, preferably at least two or three composition(s) of containers of a complete decoration sequence, so that advantageously the production sequence can proceed without disruption. Preferably, a container detected as faulty or deemed faulty by the monitoring device is replaced by the next following container which is not deemed faulty and which is equipped with the same decoration. The buffer device may thus be a buffer device which is arranged (directly) upstream of the filling device and/or packing device in the transport direction.

The present invention is furthermore directed at a method for treating containers with at least a first container treatment device which is suitable and intended for providing the containers to be treated with a different decoration, and which provides the containers to be treated with a decoration corresponding to a predefined decoration sequence, having a transport device which supplies and/or discharges the containers treated by the first container treatment device along a predefined transport path, preferably individually and successively, to at least one monitoring device for monitoring the treated containers.

According to the invention, the monitoring device monitors the containers at least with respect to the decoration applied by the first container treatment device, and depending on the monitoring result undertakes and/or arranges a change in the predefined decoration sequence of at least the first and/or a second container treatment device, preferably of a direct printing machine. Here, the apparatus described above for treating containers is in particular configured and provided for performing this method, i.e. all features listed for the apparatus described above are also disclosed for the method described herein and vice versa.

In an advantageous embodiment, the monitoring device, depending on the monitoring result, arranges an after-production and/or intermediate production of at least one container, preferably with the decoration of the monitored container.

As described above, the proposed method is particularly advantageous for small batches, i.e. preferably for methods for treating containers in which fewer than 5000 containers, preferably fewer than 1000, preferably fewer than 500, preferably fewer than 100, preferably fewer than 50, and particularly preferably fewer than 11 containers are provided with the same or identical decoration (preferably provided with an identical pattern by the direct printing device and/or filled with the same product and/or with the same closure).

Figure 2:
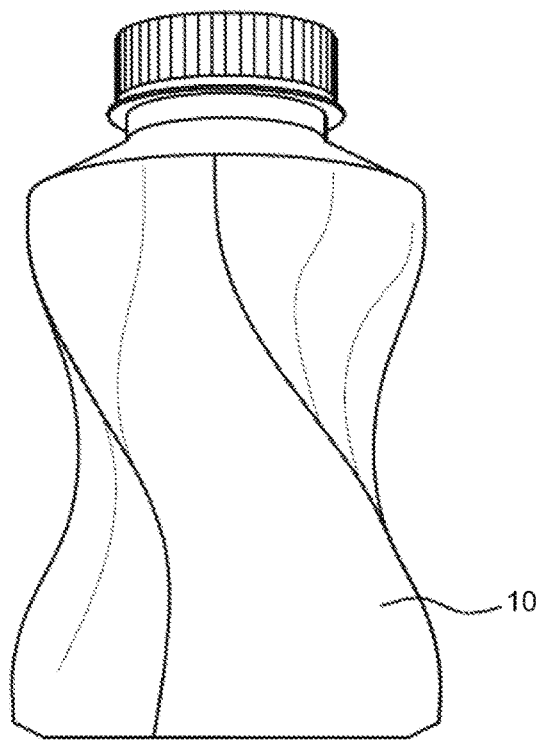
Figure 3:
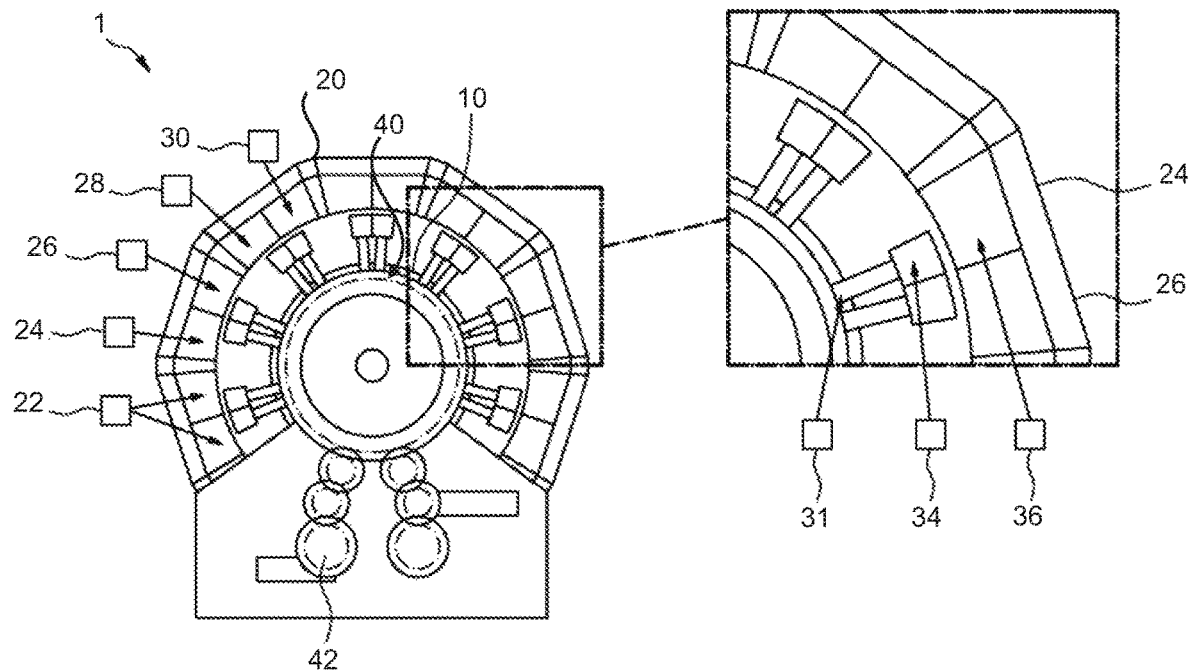
Figure 4:
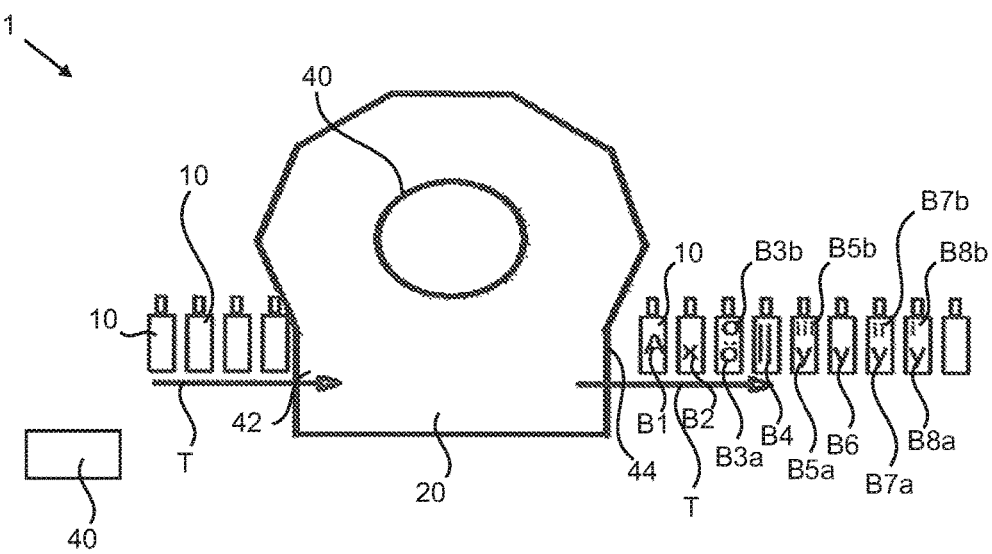
Figure 5:
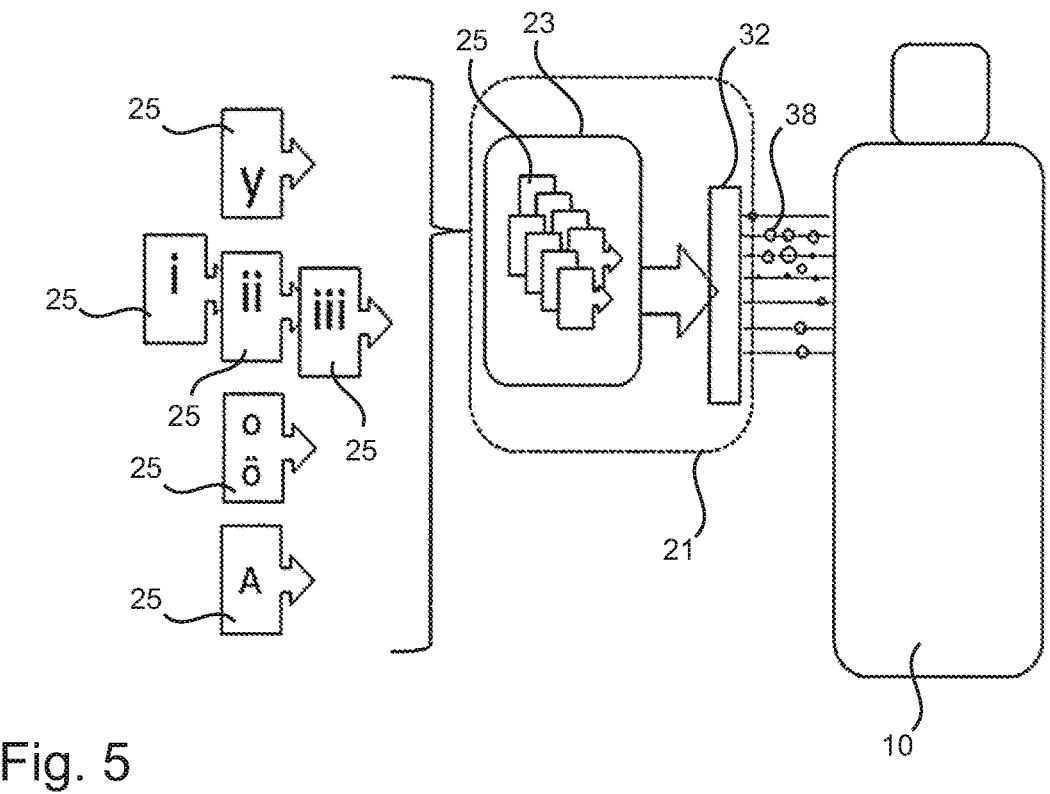
Figure 6:
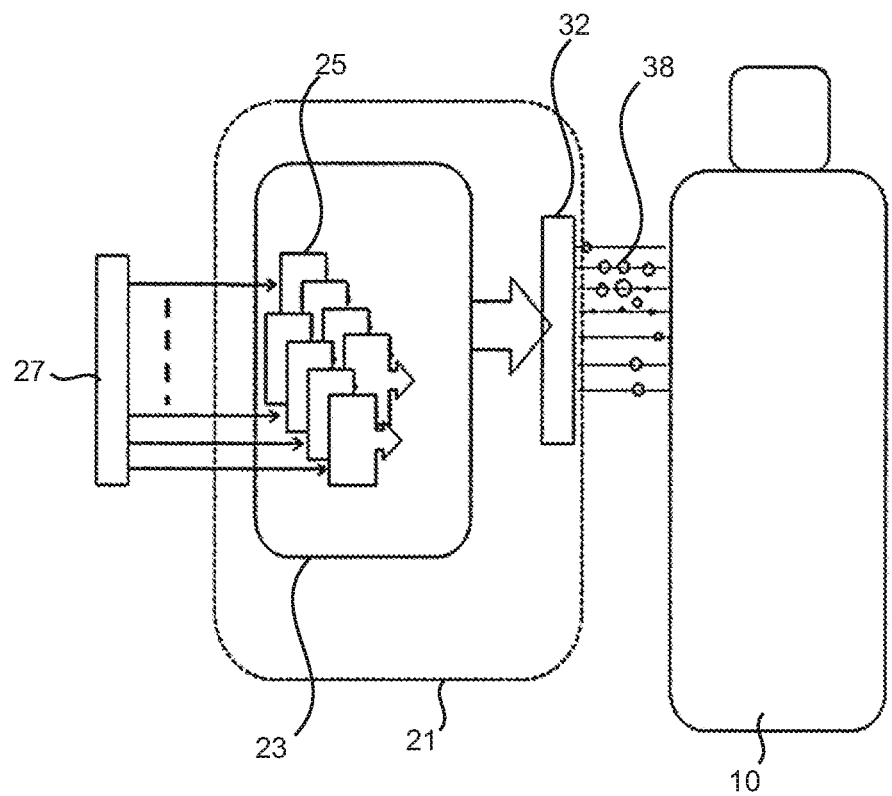
Figure 7:
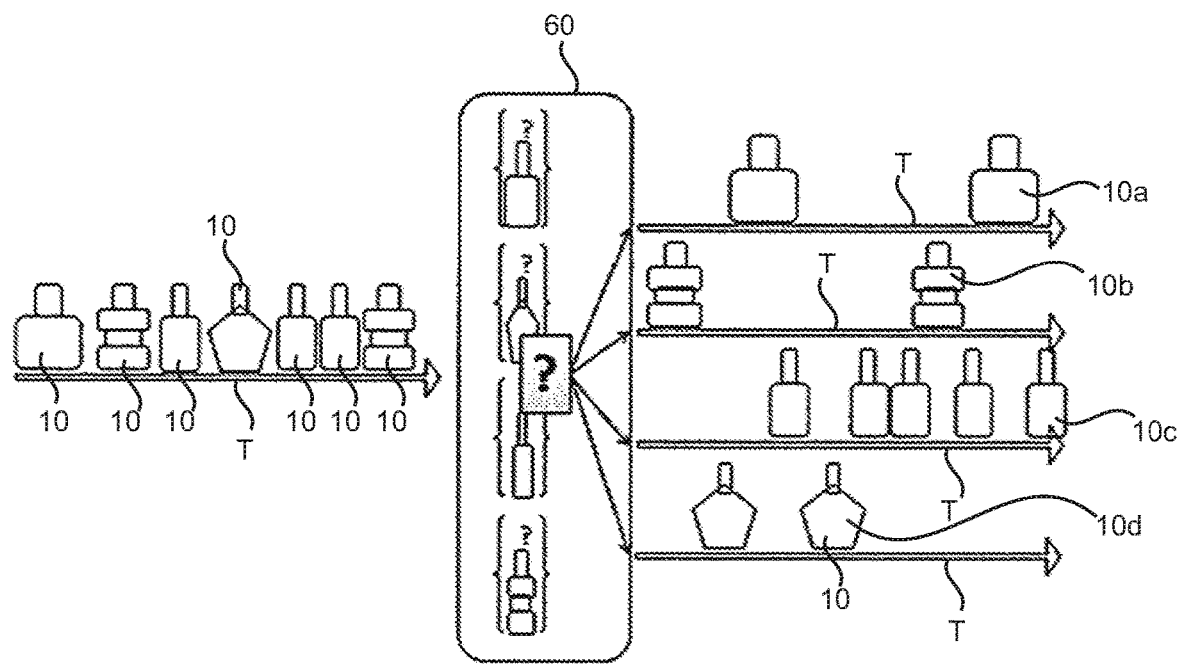
Figure 8:
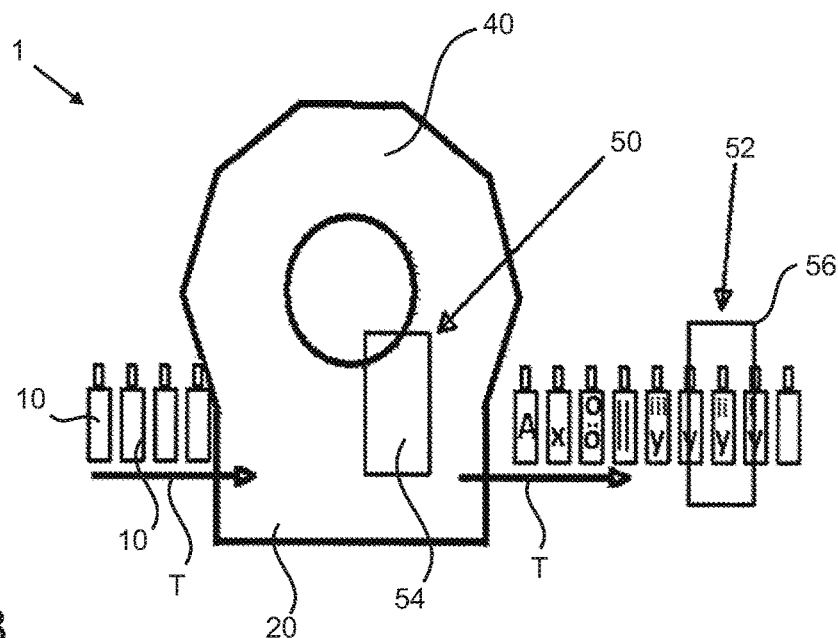
Figure 9:
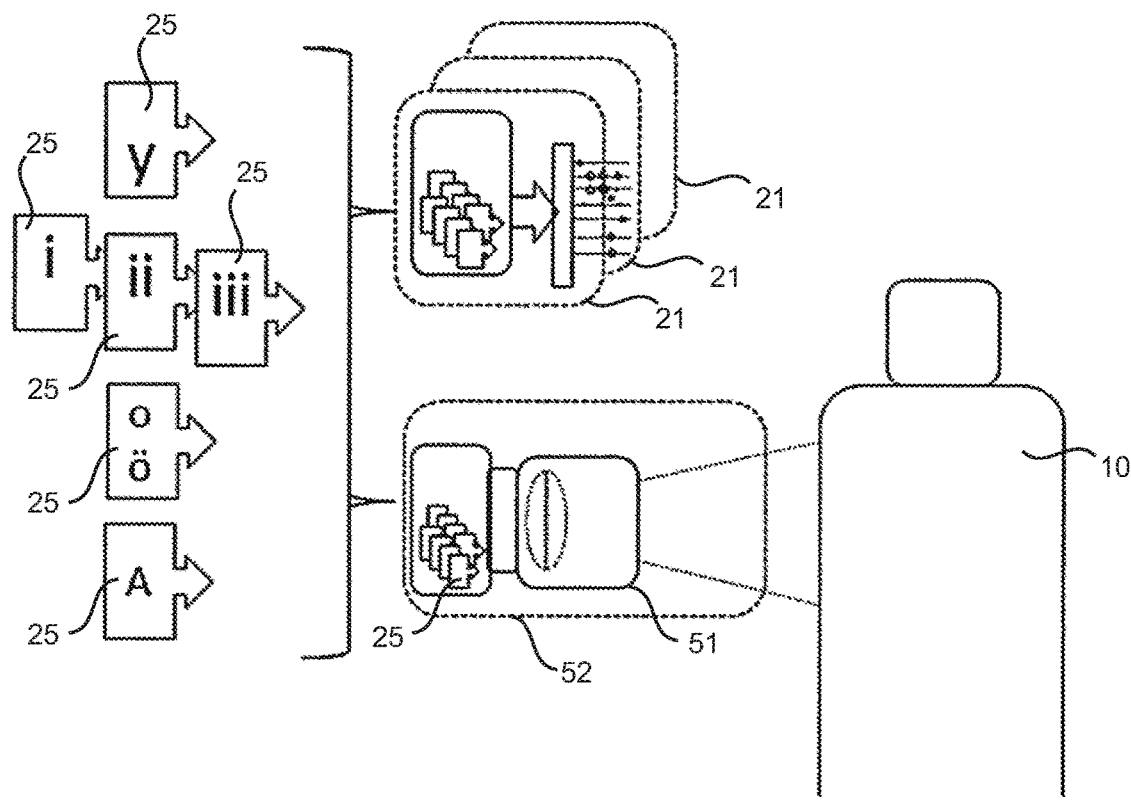
Figure 10:
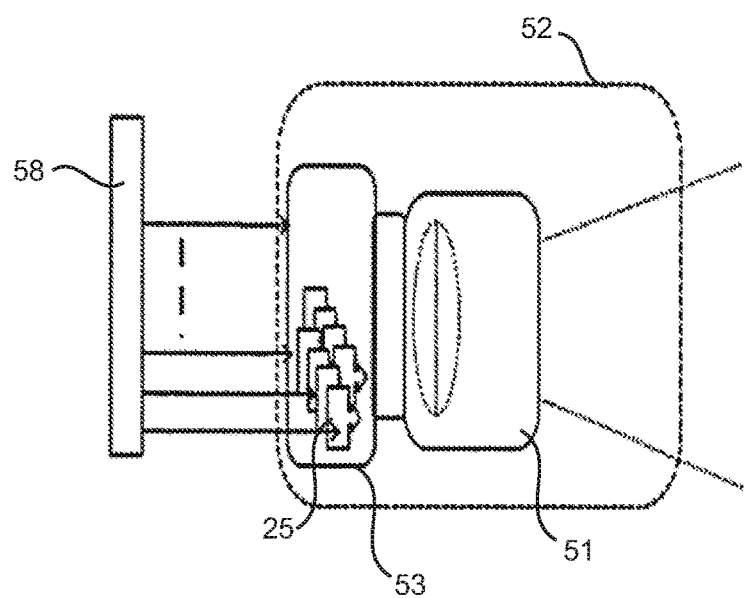

Further advantages and embodiments arise from the attached drawings. The drawings show:

FIG. 1 a process diagram of a RIP process in the PS/PDF workflow;

FIG. 2 an illustration of a container to be printed;

FIG. 3 an illustration of an embodiment of an apparatus according to the invention;

FIG. 4 a diagrammatic depiction of an apparatus according to the invention in a further embodiment;

FIG. 5 a diagrammatic depiction of a direct printing machine;

FIG. 6 a diagrammatic depiction of an interaction device;

FIG. 7 a diagrammatic depiction of a sorting device;

FIG. 8 a diagrammatic depiction of an apparatus according to the invention in a further embodiment;

FIG. 9 a diagrammatic depiction of an apparatus according to the invention in a further embodiment;

FIG. 10 a diagrammatic depiction of a monitoring device; and

Figure 11:
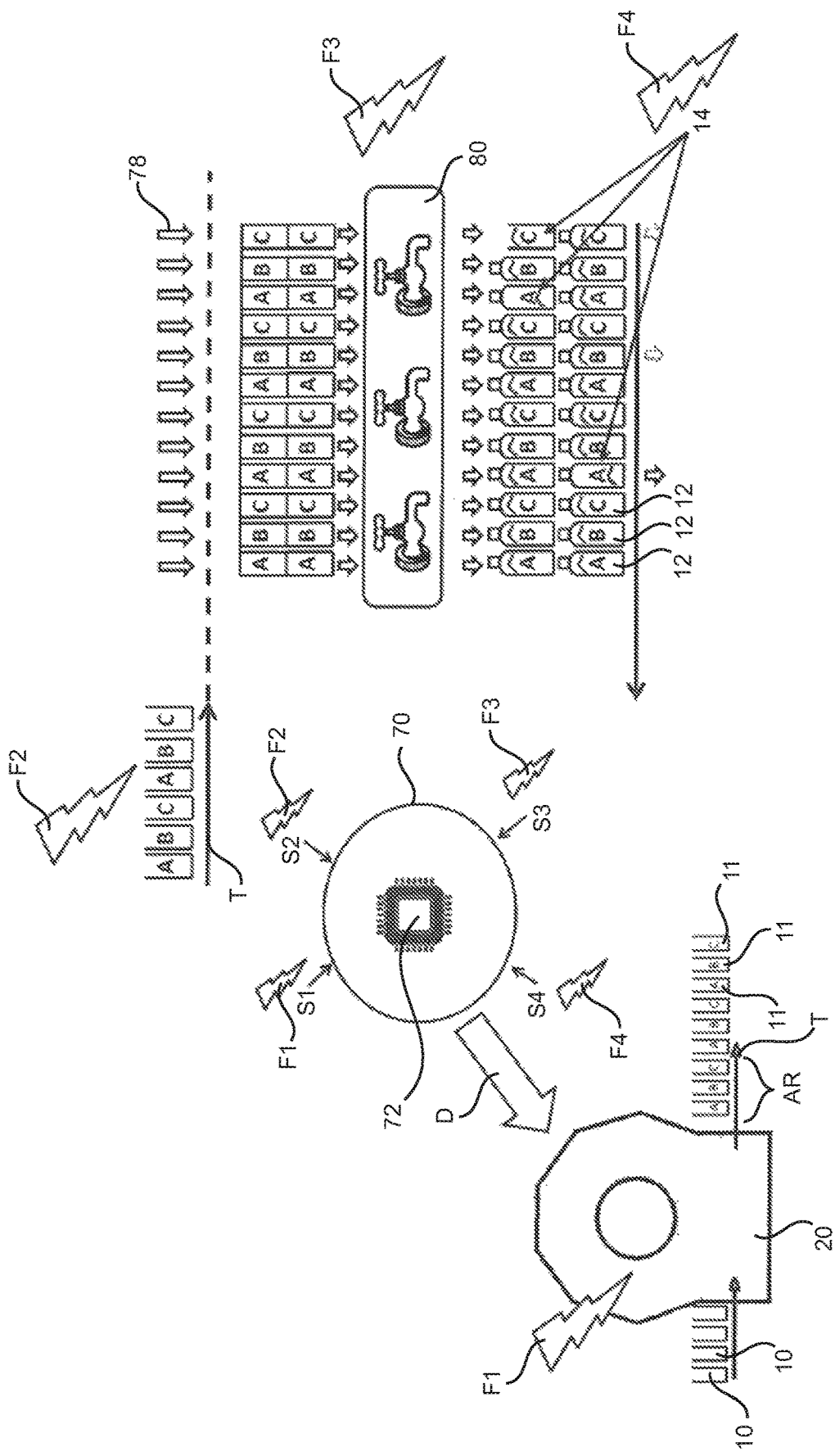

FIG. 11 a diagrammatic depiction of an apparatus for treating containers.

FIG. 1 shows a flow diagram of an RIP process in the PS/PDF workflow. A PostScript document present initially is converted into a PDF document by a so-called normalizer, by interpretation of the PS file or conversion into PDF. This in turn is converted by means of a rendering process into bytemap (half-tones) and again converted via a so-called rasterizer via screening methods into a bitmap (raster). A resulting raster document may be used for a print process by a print head of a printing assembly which requires so-called RIP files, which essentially determine the sequence and droplet size with each individual print nozzle is actuated in each of the possible print colours.

FIG. 2 shows an exemplary illustration of a container 10 to be printed, for which the method or apparatus according to the invention is particularly advantageous. The drawing shows a helically turned container 10, a so-called twist-shaped container. Such containers can only be labelled with a so-called sleeve, a plastic hose which is thermally shrunk onto the container 10. For such containers, direct printing is therefore particularly advantageous.

FIG. 3 shows a depiction of an embodiment of an apparatus 1 according to the invention with a printing device 20 or direct printing machine 20 for printing successive containers 10 which are supplied and discharged by a transport device 40, e.g. via a supply device 42. The printing device 20 or direct printing machine 20 has various printing assemblies 22, 24, 26, 28 and 30, which apply inks of different colour to the container 10 to be printed. Thus the printing assembly 22 applies white ink, the printing assembly 24 applies yellow ink, the printing assembly 26 applies magenta ink, the printing assembly 28 applies cyan ink, and the printing assembly 30 applies black ink to the respective container 10 to be treated. A (or each) printing assembly 24, 26 preferably has a print head 32, a print head control device 34 (print actuator) and an ink tank 36.

FIG. 4 shows a diagrammatic depiction of an apparatus 1 according to the invention in a further embodiment. The drawing shows a printing device 20 or direct printing machine 20 with a bottle stream and variable printing. Again, a plurality of (preferably identical) containers 10 is transported or conveyed by a transport device 40 in the transport direction T, and in particular supplied by a supply device 42 to the printing device 20 or direct printing machine 20. Also inside the printing device 20 or direct printing machine 20, the containers 10 are transported by the transport device 40, preferably from one printing assembly to another printing assembly. The printing device 20 or direct printing machine 20 here prints successive containers in different fashions. Whereas the last container 10 printed was printed only with an image element B1 (the letter "A"), the preceding container was printed with image element B2 ("x"), the further preceding container 10 with both image elements B3a and B3b (namely "o" and "ö"), the further preceding container 10 with image element B3 (comprising two long vertical lines). The four further preceding containers 10 all have a common image element (reference signs B5a, B6, B7a, B8) in the letter "y" which is arranged respectively (preferably) at a lower region of the container. Furthermore, these three said containers also comprise a variable image element (reference signs B5b, B7b, B8b) which is arranged respectively, preferably again at the same or corresponding point, here namely an upper region of the container. This variable image element may for example comprise country-specific content or type-dependent information or content.

FIG. 5 shows a diagrammatic depiction of a printing device or direct printing machine with several RIP files 25. From the set of RIP files 25 (image elements) shown, by combination or composition thereof, several different image elements (such as B3a and B3b) can be produced, or several image elements can be printed onto a container. The set of image elements (to be printed), which are preferably present as RIP files 25, are stored in the memory device 23 of a printing assembly 21 and/or a printing device 20 or direct printing machine 20. Reference sign 32 designates a print head of the printing assembly 21 which is currently in operation applying ink droplets 38, the size of which can preferably also be varied by the printing assembly 21, to the container 10 to be printed.

FIG. 6 shows a diagrammatic depiction of an interaction device 27, which may be an interface, for selection of a RIP file 25. Via this interaction device 27, the predefined sequence of printed images or image elements (B1-B8) to be printed can be selected or modified. Via this interaction device 27, the set of image elements can be modified by adding or removing one or more image elements (B1-B8).

FIG. 7 shows a diagrammatic depiction of a sorting device 60, a Secamat with a sorting function. The transport device 40 firstly transports containers 10 of different types (10a, 10b, 10c, 10d). Preferably, the apparatus 1 comprises a sorting device 60 which, viewed in the transport direction T, is particularly preferably arranged downstream of the printing device 20 or direct printing machine 20, and which classifies or sorts the containers 10 into different transport lines depending on their type (10a, 10b, 10c, 10d). Preferably, a printing device or direct printing machine can print containers of different types. The sorting device 60 may therefore sort the containers for example depending on a differently applied image element (B1-B8) or print.

FIG. 8 shows a diagrammatic depiction of the apparatus 1 according to the invention, shown in FIG. 4, in a further embodiment. In contrast to the embodiment shown in FIG. 4, this also has two monitoring devices 50, 52. These differ preferably in their arrangement in relation to the printing device 20 or direct printing machine. Preferably, a monitoring device 50 may be arranged in the printing device 20 or direct printing machine 20, wherein preferably the print is monitored in the printing device 20 or direct printing machine 20, and/or a monitoring device 52 may be arranged after the printing device 20 or direct printing machine 20, preferably on the conveyor belt or transport device, wherein the print can then preferably be monitored "on the line" in the printing device or direct printing machine 20, and/or it may be arranged in its own, fixedly installed inspection machine.

FIG. 9 shows a diagrammatic depiction of an apparatus 1 according to the invention in a further embodiment. The drawing shows firstly an apparatus 1 indicated diagrammatically in FIG. 5, but here with three printing assemblies 21 and an additional monitoring device 52. The monitoring device 52 preferably comprises an inspection device 51 which optically or visually inspects at least one surface region of a container 10. The inspection device 51 may for example be configured as a camera or CCD chip etc. Also, the monitoring device 52 preferably has a memory device 53 in which image elements (B1-B8) can be stored or saved, preferably as RIP files 25. Preferably, the same image elements (B1-B8) or the same RIP files are transmitted or transferred both to at least one and preferably all (memory devices 23) of the printing assemblies 21 and also to the memory device 53 of the monitoring device 52. It is however also possible that not actually the same files are transmitted, but merely an original set of image elements serves as a starting set of image elements in each case, and image element files derived therefrom are transmitted to the memory devices 23 of the printing assemblies 21 and to the memory device 53 of the monitoring device 52. Here, a respective ink colour of the printing assemblies may be taken into account for example.

FIG. 10 shows a diagrammatic depiction of an embodiment of a monitoring device 52 (according to the invention). The reference signs already used in the description of FIG. 9 designate the same elements here. The monitoring device 52 has an interaction device 58 which corresponds to an interaction device 27 of the printing device 20 or direct printing machine 20 or printing assemblies 21, or can preferably be connected thereto via a communication device. The interaction device 58 here serves as an interface, preferably for selection of the master print or an image element (to be monitored) or image elements (B1-B8) to be monitored.

FIG. 11 shows a diagrammatic depiction of an embodiment of an apparatus 100 according to the invention for treating containers 10. The drawing shows a printing device or direct printing machine 20, a transport device which transports the containers 10 in the transport direction T, e.g. between the printing process in the direct printing machine 20 and the filling process in the filling device 80, a buffer section 78 before a filling device 80 including closer, here shown as a linear filler. Furthermore, a buffer section and onward transport to packaging for example is shown. In the individual steps, production faults F1-F4 may occur. For example, when filling, a fault F4 caused by filling with the wrong fill level; a fault on closing; a fault F2 during transport; or a fault F1 at the start during printing. A system 70 or a (central) control device 70 detects the fault events F1-F4 and informs the printing device 20 or direct printing machine 20 of the missing parts or the nature and number of defectively produced or treated containers 10 or those with incorrect decoration. Preferably, the system or the control device 70, which may comprise a processor 72, preferably immediately indicates the missing parts to the printing device 20 or direct printing machine 20 so that the sequence can be refilled. Preferably, the system or control device 70 preferably indicates the defective parts in a specific order, which allows direct recreation of the correct or fault-free state for the fault location. Preferably, a normal sequence is interrupted and the defective container is produced within a sequence (of equipment).

In the example depicted with the fault-free decoration sequence R, "ABC", from the various decoration elements "A", "B", "C" (which may symbolise image elements with which the containers are to be printed, and hence the printed containers 11 have this decoration), any (after-) production could appear as follows: "ABC ABAC AABCC" etc. (in a second step, an A decoration is produced in between the decorations B and C, and in a third step the decoration A is produced twice and the decoration C is also produced twice in direct succession).

In the apparatus 100 shown in FIG. 11, the inlet buffer could be controlled such that until the arrival of missing parts, it divides the normal sequence into the buffers such that three of the 4×3 filling positions are always filled. When missing parts arrive, the fourth group of three is completed with the missing parts. The buffer section at the filler outlet is then controlled such that in the output row, the defectively underfilled container "A" is ejected and the container "A" is re-supplied from the following row. The four groups of three may be output complete to the packing machine on the conveyor belt.

The applicant reserves the right to claim as essential to the invention all features disclosed in the application documents where novel individually or in combination relative to the prior art. It is furthermore pointed out that in the individual figures, features have been described which may be advantageous taken in themselves. The person skilled in the art will immediately find that a specific feature described in one figure may also be advantageous without the use of further features from this figure. The person skilled in the art will also recognise that advantages may be obtained by a combination of several features shown individually or in different figures.

LIST OF REFERENCE SIGNS

1 Apparatus
10, 10a, 10b, 10c, 10d Container
11 Printed container
12 Filled container
20 Direct printing machine, printing device
21, 22, 24, 26, 28, 30 Printing assembly
23 Memory device
25 RIP file
27 Interaction device
32 Print head
34 Print head control device
36 Ink tank
38 Ink droplet
40 Transport device
42 Supply device
50, 52 Monitoring device
51 Inspection device
53 Memory device 54, 56 Monitoring region
58 Interaction device
60 Sorting device
70 Control device
72 Processor
80 Filling device
100 Apparatus for treating containers
D Arrow
F1-F4 Defect
R Decoration sequence
T Transport direction
B1, B2, B3a, B3b, B4 Image element
B5a, B5b, B6, B7a, B7b Image element
B8a, B8b Image element

The invention claimed is:

1. Apparatus (1) for treating containers (10) with at least a first container treatment device which is suitable and intended for providing a decoration on each of the containers (10) to be treated, wherein the decorations on the containers (10) are different from each other, wherein the first container treatment device is a direct printing machine (20) which prints the containers with the decoration being an image element (B1-B8) provided according to a predefined decoration sequence (R), having a transport device (40), which supplies and/or discharges the containers (10) treated by the first container treatment device along a predefined transport path to at least one monitoring device (50, 52) for monitoring the treated containers (10), wherein the monitoring device is suitable and intended to monitor the printed containers with respect to an image element applied by the direct printing machine (20) and has a memory device (53) which stores at least one set of image elements to be monitored
characterised in that the monitoring device is suitable and intended for initiating a change in the predefined decoration sequence with respect to the image elements to be applied by the direct printing machine depending on the monitoring result, wherein the apparatus comprises an interaction device which is suitable and intended for changing the predefined sequence of image elements to be printed by the direct printing machine and the predefined sequence of the image elements stored in the monitoring device and to be monitored, wherein the interaction device has a communication connection between the direct printing machine and the monitoring device and the interaction device serves as an interface for the selection of the image elements to be monitored.

2. Apparatus (1) according to claim 1, characterised in that the monitoring device (50, 52) is suitable and intended for arranging, depending on the monitoring result, an after-production and/or intermediate production of at least one additional container (10).

3. Apparatus (1) according to claim 1, characterised in that via a change in the decoration sequence (R), a change is achieved in the number and order of the decorations to be applied to the containers (10) by at least one first container treatment device.

4. Apparatus (1) according to claim 1, characterised in that the apparatus (1) is suitable and intended for undertaking a predefined change to the predefined decoration sequence of image elements (B1-B8) to be printed by at least one printing assembly (22, 24) by corresponding modifications at both the direct printing machine (20) and the monitoring device (50, 52).

5. Apparatus (1) according to claim 1, characterised in that the monitoring device (50, 52) is suitable and intended for undertaking, at least for a container (10) to be monitored, a change in assignment of an image element (B1-B8) stored in the memory device (23) for this container.

6. Apparatus (1) according to claim 1, characterised in that without interrupting the printing operation of the printing assembly (22, 24) the predefined sequence of image elements (B1-B8) to be printed successively by this printing assembly (22, 24) is changed via the interaction device (27), and/or the set of image elements (B1-B8) stored in the memory device (23) of the respective printing assembly (22, 24) is modified via the interaction device (27).

7. Apparatus (1) according to claim 1, characterized in that via the communication connection, changes to the predefined sequence of image elements to be printed and changes to the predefined sequence of image elements to be monitored are mutually compared.

8. Apparatus (1) according to claim 1, wherein the interaction device has a communication connection between the direct printing machine and the memory device of the monitoring device.

9. Apparatus (1) according to claim 1, characterised in that a change of the predefined sequence of image elements to be printed by the direct printing machine takes place without transmission of an image element to the direct printing machine.

10. Apparatus (1) according to claim 1, characterised in that for each container to be monitored, the monitoring device is suitable and intended to undertake a check of the applied image element taking into account at least one image element to be monitored and uniquely assigned to this container from the set of image elements to be monitored and a change to the image element assigned to a container to be monitored with respect to which the container is to be monitored, is made via a change in assignment and without transmission of an image element.

11. Apparatus (1) according to claim 1, characterised in that no information concerning an image content is transferred.

12. Apparatus (1) according to claim 1, characterised in that a change in the predefined sequence of image elements to be printed by the direct printing machine and a change in the predefined sequence of the image elements stored in the monitoring device and to be monitored takes place without transmission of at least one modified image element.

13. Method for treating containers (10) with at least a first container treatment device which is suitable and intended for providing containers (10) to be treated with a decoration, wherein the decorations on the containers (10) are different from each other, the first container treatment device is a direct printing machine (20) which prints the containers (10) with the decoration being an image element (B1-B8) provided according to a predefined decoration sequence (R), having a transport device (40) which supplies and/or discharges the containers (10) treated by the first container treatment device along a predefined transport path to at least one monitoring device (50, 52) for monitoring the treated containers (10), wherein the monitoring device (50, 52) is suitable and intended to monitor the printed containers with respect to an image element applied by the direct printing machine (20) and has a memory device (53) which stores at least one set of image elements to be monitored, having an interaction device, which is suitable and intended for changing the predefined sequence of image elements to be printed by the direct printing machine (20) and the predefined sequence of the image elements stored in the monitoring device (50, 52) and to be monitored, wherein the interaction device has a communication connection between the direct printing machine and the monitoring device and the interaction device serves as an interface for the selection of the image elements to be monitored, comprising the following steps:

printing the containers (10) with the decoration being an image element (B1-B8) provided according to predefined decoration sequence (R);

monitoring the printed containers (10) with respect to an image element applied by the direct printing machine (20);

depending on the monitoring result, initiating a change in the predefined sequence of image elements to be printed by the direct printing machine and in the predefined sequence of the image elements stored in the monitoring device.

14. Method according to claim 13, characterised in that the monitoring device (50, 52), depending on the monitoring result, arranges an after-production and/or intermediate production of at least one additional container (10).

15. Method according to claim 13, characterised in that a change of the predefined sequence of image elements to be printed by the direct printing machine takes place without transmission of an image element to the direct printing machine.

16. Method according to claim 13, characterised in that for each container to be monitored, the monitoring device undertakes a check of the applied image element taking into account at least one image element to be monitored and uniquely assigned to this container from the set of image elements to be monitored and a change to the image element assigned to a container to be monitored with respect to which the container is to be monitored, is made via a change in assignment and without transmission of an image element.

17. Method according to claim 13, characterised in that no information concerning an image content is transferred.

18. Method according to claim 13, characterised in that a change in the predefined sequence of image elements to be printed by the direct printing machine and a change in the predefined sequence of the image elements stored in the monitoring device and to be monitored takes place without transmission of at least one modified image element.

19. Apparatus (1) for treating containers (10) with at least a first container treatment device which is suitable and intended for providing a decoration on each of the containers (10) to be treated, wherein the decorations on the containers are different from each other and provide the containers (10) to be treated with a decoration provided according to a predefined decoration sequence (R), having a transport device (40), which supplies and/or discharges the containers (10) treated by the first container treatment device along a predefined transport path to at least one monitoring device (50, 52) for monitoring the treated containers (10), characterised in that the monitoring device (50, 52) is suitable and intended for monitoring the containers (10) at least with respect to the decoration applied by the first container treatment device, and depending on the monitoring result to initiate a change in the predefined decoration sequence (R) of at least the first and/or a second container treatment device, wherein the monitoring device has a memory device in which the predefined decoration sequence of the decoration to be applied by the first container treatment device to the containers to be treated is stored, and the monitoring device (50, 52) is suitable and intended for arranging, depending on the monitoring result, an after-production and/or intermediate production of at least one additional container (10) with the decoration of the monitored container.

20. Apparatus (1) according to claim 19, characterised in that such a change in the predefined decoration sequence is achieved via a central control device, wherein the apparatus has at least one buffer device, which is controlled by the central control device such that until arrival of the at least one predefined after-produced and/or intermediate produced additional container, at least one other container is not transported or is retained.

\* \* \* \* \*